Feb. 11, 1947.     G. F. RACKETT     2,415,442
FILM STRIPPING
Filed April 24, 1942
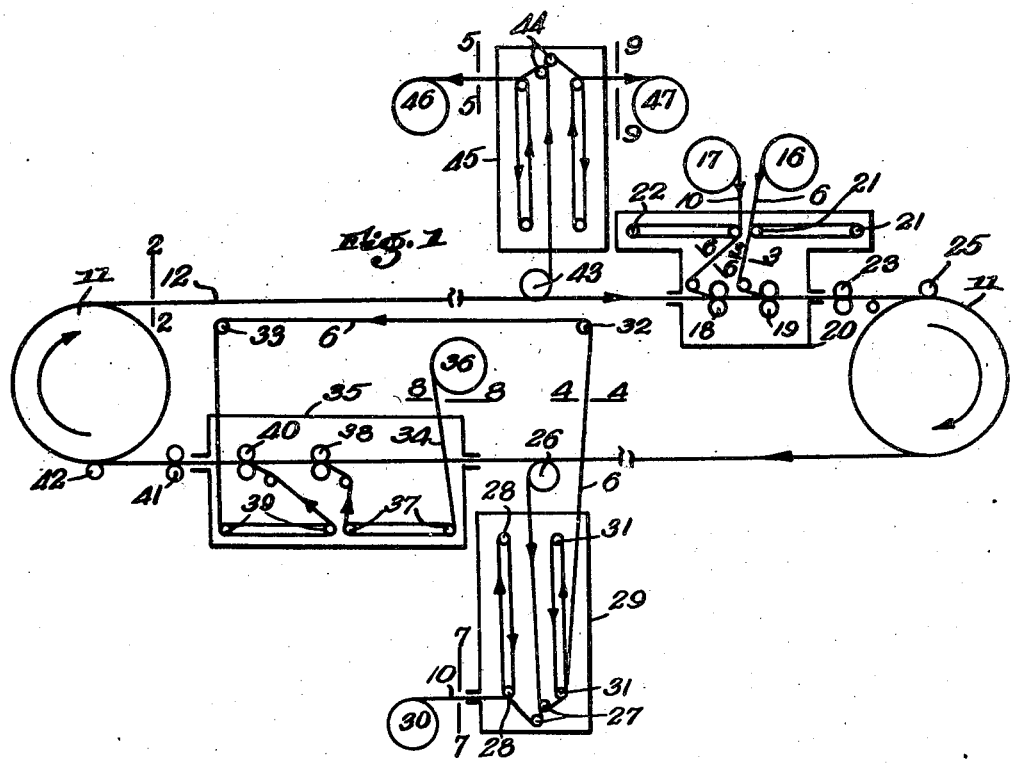
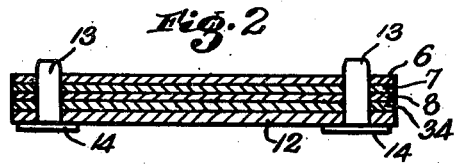
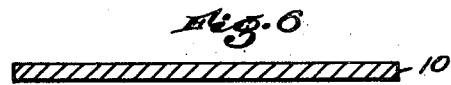
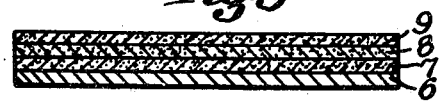
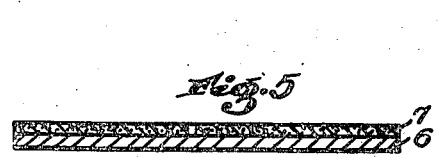

Patented Feb. 11, 1947

2,415,442

UNITED STATES PATENT OFFICE 2,415,442

FILM STRIPPING

Gerald F. Rackett, Los Angeles, Calif., assignor to Technicolor Motion Picture Corporation, Hollywood, Calif., a corporation of Maine Application April 24, 1942, Serial No. 440,323

20 Claims. (Cl. 41—33)

In the art of cinematography it is often desirable to transfer an exposed layer of emulsion from one film to another with each point of the emulsion layer bearing the same relationship to the sprocket holes of the new film as it bore to the sprocket holes of the old film. For example in producing motion pictures in color it is desirable to have the differently sensitized layers of emulsion superposed on a single film, so as to avoid the necessity of using a special multiple film camera, but after the emulsion layers are exposed and developed it is desirable to have them on separate films so that they can be separately used in printing as may color films as desired. The multi-layer film may be of the reversal type like Kodachrome or any other integral pack type and after the layers are developed and transferred to separate bases the separate films may be used as color-separation films to produce any desired number of composite color films by the inbibition process or other color process suitable for making positive prints in color.

Notwithstanding the aforesaid desirability of transferring emulsion layers from one film to other bases, heretofore no practical way has been found to make the transfer because of the thin stretchable nature of emulsion layers. Even if a layer is transferred with only slight distortion the resulting film is not suitable for cinematographic use because the different points of the pictures bear relationships to the sprocket holes of the new film slightly different from the relationship they bore to the sprocket holes of the original film. In color cinematography this makes it impractical to register the different color aspects of a scene, resulting in poor definition, color fringes and image distortion.

Objects of the present invention are to provide a way of transferring an emulsion layer from one film to another which does not injure or distort the emulsion layer, which positions the emulsion layer on the new film is precisely the same relationship to the sprocket holes as in the case of the old film, which affords precise registration, which permits the transfer of layers of a multi-layer film after the layers are exposed and before they are developed, which therefore permits the layers to be developed differently, which is rapid and economical in operation and which is generally superior to transfer processes heretofore proposed.

In transferring a layer from one film base to another according to this invention the two films are fed into superposition on an endless belt or other carrier having a succession of register teeth traveling in an orbital path and engaging in the sprocket holes of the films to hold the two films in precise registration while the layer is being adhesively joined to the new base. Preferably the layer is partially loosened from the original base before the two films are brought together on the carrier, but the loosening is not carried far enough to permit the layer to become displaced relatively to the original base before the two films have been brought together in precise registration on the carrier. If the picture layer be mounted on the original base with an adhesive which is soluble in a solvent, the film is preferably immersed in the solvent (or subjected to a solvent vapor or gas) before it is fed to the carrier. Inasmuch as the solvent treatment tends to expand the film somewhat, the new base is preferably subjected to the same treatment so that it expands to the same extent, it being understood that after the layer has been transferred and the two films are dried they both contract to the same size. After the films are fed together on the register belt the aforesaid adhesive continues to soften and the picture layer gradually adheres to the new film because of the tackiness of the layer, which is usually formed of gelatin, resulting from the aforesaid liquid treatment. After the two films have travelled with the carrier a sufficient distance to permit the picture layer to adhere firmly to the new film and to be readily peelable from the original film, the two films are peeled apart to complete the transfer of the picture layer from the original film to the new base. While the layer may be peeled off before the original film is removed from the carrier, preferably both films are fed from the carrier before they are peeled apart.

If the original film has more than one layer to be transferred the aforesaid operation is repeated. If the picture layers are mounted on the original film by liquid-soluble adhesives, adhesives which are soluble in different liquids are preferably used under the respective layers so that the liquid treatment which loosens the one layer does not loosen succeeding layers. For example the outer layer may be mounted on the next layer with a water soluble adhesive and the next layer may be mounted on the base or on a third layer with an alcohol soluble adhesive. However, adhesives which are soluble in the same liquid, for example water, may be used at both interfaces, the outer layer loosening first because the liquid penetrates to the outer interface before it reaches the inner interface.

While the various layers of a multi-layer film may be transferred to new bases on separate carriers or in separate operations on the same carrier, they are preferably carried out concomitantly at successive locations along the aforesaid orbital path of the same carrier. Whether the new bases are fed to the carrier at successive locations or successively at the same location, the films are fed to the carrier so that corresponding sprocket holes of the different films engage the same teeth. Thus even if the position of the teeth on the carrier varies slightly throughout the length of the carrier, the color-separation films will register precisely with each other because the same slight error will occur in all the films at the same location.

For the purpose of illustration a typical embodiment of the invention is illustrated in the accompanying drawing in which:

Fig. 1 is a diagrammatic view of stripping apparatus for transferring the picture layers of a composite film to separate bases to form color-separation films; and Figs. 2 to 9 inclusive are sections on lines 2 to 9 of Fig. 1, parts being broken away.

One type of composite film suitable for use on the stripping machine of Fig. 1 is illustrated in Fig. 3. This type comprises an ordinary base 6 with three layers of emulsion 7, 8 and 9, the layer 7 being permanently mounted on the base in the usual way, the layer 8 being mounted on the layer 7 with an alcohol-soluble adhesive and the layer 9 being mounted on the layer 8 with a water-soluble adhesive. In this way the layer 9 may be loosened with water without loosening the layer 8 and the layer 8 may be subsequently removed without loosening the layer 7. However, it will be understood that the present invention, at least in its broader aspects, is independent of the particular construction of the composite film. As shown in Fig. 6 the separate base material 10 to which the layers of emulsion are to be transferred may comprise ordinary cinematographic film base.

The particular embodiment of the invention chosen for the purpose of illustration comprises two drums or sheaves 11 over which is trained an endless belt 12 along the margins of which are mounted rows of register pins or teeth 13 adapted to fit into the sprocket holes of the films. While the pins may be mounted on the belt in various ways, they are preferably fitted into perforations in the belt corresponding to the perforations in the films with heads 14 seating against the back of the belt. Preferably both the belt and the pins are formed of metal and the heads 14 are soldered to the back of the belt.

As shown in Fig. 1 the composite film 6 is fed into the machine from a reel 16 and the uncoated base material 10 is fed from a reel 17, the film 10 being fed to the belt between a pair of rollers 18 which seat the film firmly on the belt with the teeth 13 projecting through the sprocket holes of the film, and the composite film 6 being fed to the belt between a similar pair of seating rolls 19 is superposed relation to the film 10. In transit to the belt the composite film feeds through a water tank 20 to soften the adhesive between the layers 8 and 9, the film zigzagging back and forth over opposed pairs of guide rolls 21 to afford time for the water to soften the adhesive somewhat but not sufficiently for the layer to become displaced before the composite film is seated on the belt. Inasmuch as the film may be expanded slightly by the water, the base 10 is subjected to similar treatment by zigzagging back and forth over similar sets of rollers 22 so that the two films are equally affected. The belt enters and leaves the water tank through narrow slits which permit only a small amount of leakage, this leakage being continuously replaced by suitable supply means. After the belt emerges from the tank the films are again pressed together and against the belt by means of another pair of seating rolls 23. As the belt starts around the sheave 11 another roller 25 presses the film snugly against the belt. In the curved portion of the path of the belt, throughout approximately 180° of the periphery of the drum, the pins on the belt separate fanwise to force the films more tightly together. After the films are thus subjected to the liquid treatment and then pressed together on the belt they travel with the belt a sufficient distance for the top layer 9 to adhere more firmly to the new base 10 than to the underlying layer 8, the layer 9 adhering to the new base by virtue of the tacky nature of the gelatin or other material constituted in the layer as a result of the previous water treatment. Thus as the films travel together on the belt they are held in exact registration by the pins on the belt while the layer 9 is transferred from the composite film to the base 10.

After the layer 9 has become firmly attached to the new base both films are fed from the belt over a roller 26 between a pair of rollers 27 where the two films are peeled apart, the composite film 6 with its remaining layers 7 and 8 (Fig. 4) feeding to the right and the base 10 with the layer 9 (Fig. 7) feeding to the left. The film 10 loops back and forth over pairs of guide rolls 28 in a drying compartment 29 until the film is dry and then it feeds out to a take-up roll 30. The composite film 6 loops back and forth over pairs of guide rolls 31 in the drying compartment and then feeds over guide rolls 32 and 33 to a second station where it is fed back to the belt in superposed relationship to a new base 34 (Fig. 8) to which the layer 8 is to be transferred.

At the second station a tank 35, corresponding to tank 20 at the first station, is arranged to wet both films in like manner. If the layer is joined to the layer 7 by means of an alcohol-soluble adhesive, the tank 35 contains alcohol. The blank film 34 feeds into the tank from a feed roll 36, then loops back and forth over pairs of guide rolls 37 and then feeds to the belt between a pair of seating rolls 38. The composite film 6 loops back and forth over pairs of guide rolls 39 and then feeds to the belt in superposed relation to the base 34 between a pair of seating rolls 40. After the belt emerges from the tank 35 it passes between another pair of pressure rolls 41 and thence under a pressure roll 42, thence around the left-hand drum 11 and thence throughout a stretch sufficiently long to permit the layer 8 to become firmly attached to the new base 34, whereupon the two films feed from the belt over the guide roll 43 to a pair of guide rolls 44 where the two films are peeled apart. The composite film 6, with only layer 7 remaining thereon (Fig. 5), feeds to the left through the drying compartment 45 and thence to take-up reel 46 and the base 34, with the layer 8 adhering thereto (Fig. 9), feeds to the right through the drying compartment and thence to the take-up roll 47. Thus the composite film of Fig. 3 is converted into the three color-separation film shown in Figs. 5, 7 and 9.

Various details of construction of parts of the apparatus diagrammatically represented in Figs. 1 to 10 are disclosed in the prior Patents 1,675,743, 1,704,328, 1,707,695, 1,707,699, 1,707,710, 1,707,733, 1,928,714, 2,257,254, and 2,271,572.

As indicated above the color-separation films are fed in contact with the composite film on the aforesaid belt so that corresponding sprocket holes of the different films engage the same teeth of the belt. Thus in Fig. 1 the teeth which engage the sprocket holes of the composite film 6 adjacent each picture also engage the sprocket holes of both of the color-separation films 10 and 34 adjacent corresponding teeth. For example films 6 and 34 are fed to the belt at the seating rolls 40 so that the teeth which engage the sprocket holes of the two films adjacent the first picture are the same teeth which engaged the films 6 and 10 at the seating rolls 19 adjacent the first picture of the first scene on the film 6; and of course the same is true of each succeeding picture in the entire series.

One way of identifying the different pins is to apply numbers to the belt, as for example a number adjacent each pin or a number associated with each group of pins corresponding to the length of one picture space. However in practice it is usually sufficient merely to mark one pin or one pair of pins, as for example by giving this pin or pair of pins a distinctive color, in which case each of the films may be fed to the belt so that this particular pin or pair of pins is opposite the first picture of each film. If desired the splice where the two ends of the belt are joined together may be used as the marker.

In the case of the integral pack negatives the different color-aspect records in the respective layers should usually be developed differently. For example, it may be desirable to use different developers or different times of development or both. According to the present invention this can readily be done by developing the respective layers after they have been transferred to their new bases.

It should be understood that the present disclosure is for the purpose of illustration only and that this invention includes all modifications and equivalents which fall within the scope of the appended claims.

I claim:

1. In the art of transferring a layer of picture carrying medium from one film base to another, apparatus comprising a carrier having a succession of register teeth for engagement in the sprocket holes of the films, means for loosening the layer from its original base, means for feeding the films into superposition on said carrier with said teeth engaging in the sprocket holes of the films, means for adhesively joining the layer to the new base while the films are being transported on the carrier, and means for stripping the layer from its original base.

2. In the art of transferring a layer of picture carrying medium from one film base to another, apparatus comprising a carrier having a succession of register teeth for engagement in the sprocket holes of the films, means for subjecting the original film to a liquid treatment which loosens the layer and renders its surface adhesive, means for feeding the films into superposition on said carrier with said teeth engaging in the sprocket holes of the films, the carrier transporting the films in intimate contact with each other until the layer adheres firmly to the new base, and means for stripping the layer from its original base.

3. In the art of transferring a layer of picture carrying medium from one film base to another, apparatus comprising a belt having a succession of register teeth for engagement in the sprocket holes of the films, means for loosening the layer from its original base, means for feeding the films into superposition on said belt with said teeth engaging in the sprocket holes of the films, means for adhesively joining the layer to the new base while the films are being transported on the belt, and means for stripping the layer from its original base.

4. In the art of transferring a layer of picture carrying medium from one film base to another, apparatus comprising a belt having a succession of register teeth for engagement in the sprocket holes of the films, means for subjecting the original film to a liquid treatment which loosens the layer and renders its surface adhesive, means for feeding the films into superposition on said belt with said teeth engaging in the sprocket holes of the films, the belt transporting the films in intimate contact with each other until the layer adheres firmly to the new base, and means for stripping the layer from its original base.

5. In the art of cinematographic film of the type having a plurality of layers of picture carrying medium interconnected with adhesive strata respectively, apparatus comprising a carrier having a succession of register teeth for engagement in the sprocket holes of the film and bases, means for softening the outer stratum, means for feeding the film and a new base into superposition on said carrier, the carrier transporting the film and base in intimate contact until the layer adheres firmly to the new base, means for stripping the film from the layer, means for softening the next stratum of adhesive, means for feeding the film and the second base into superposition on a carrier having a succession of register teeth engaging in the sprocket holes of the film and second base, the carrier transporting the film and second base in intimate contact until the second layer adheres firmly to the second base, and means for stripping the film from the second layer.

6. In the art of cinematographic film of the type having a plurality of layers of picture carrying medium interconnected with adhesive strata respectively, apparatus comprising a carrier having a succession of register teeth traveling in an orbital path for engagement in the sprocket holes of the film and bases, means for softening the outer stratum, means for feeding the film and a new base into superposition on said carrier at one location along said path, the carrier transporting the film and base in intimate contact until the layer adheres firmly to the new base, means for stripping the film from the layer, means for softening the next stratum of adhesive, means for feeding the film and the second base into superposition on said carrier at another location along said path, the carrier transporting the film and second base in intimate contact until the second layer adheres firmly to the second base, and means for stripping the film from the second layer.

7. In the art of cinematographic film of the type having a plurality of layers of picture carrying medium interconnected with different adhesive strata respectively, the method of transferring a plurality of said layers to new bases which comprises softening the outer stratum of adhesive, feeding the film and a base into superposition on an endless belt traveling in an orbital path and having a succession of register teeth engaging in the sprocket holes of the film and base, the belt transporting the film and base in intimate contact until the layer adheres firmly to the new base, peeling the film and base apart to strip the layer from its original base, softening the next stratum of adhesive, at a subsequent location along said path feeding a second base to the belt in contact with the second layer of the film, the belt transporting the film and second base in intimate contact until the second layer adheres firmly to the second base, and peeling the film and second base apart to strip the second layer from the original base.

8. In the art of forming multi-colored cinematographic film by exposing the respective layers of multi-layer film to different color aspects and transferring the outside layers to other bases to form a plurality of color-separation films, the method which comprises successively feeding the bases into contact with the multi-layer film on an endless belt traveling in an orbital path and having a succession of register teeth engaging the sprocket holes of the films, adhesively joining the bases to the layers respectively and then stripping off the layers with the bases, the register teeth of the endless belt holding the bases in register with the multi-layer film while the layers are being adhesively joined to the bases.

9. In the art of transferring a cinematographic film layer from adhesive attachment with one base to adhesive attachment with another base on an endless belt having sprocket hole teeth and traveling in an orbital path which has curved portions and relatively straight portions, the method which comprises feeding the bases to the belt with the layer between the two bases and with said teeth projecting through the sprocket holes of both bases, each base being fed to the belt in one of said relatively straight portions, gradually loosening the layer from the first base and joining it to the second base while the films are traveling along said orbital path and, after the bases have traveled together through said orbital path a distance sufficient to cause the layer to adhere to the second base more firmly than to the first base, peeling the layer and first base apart.

10. In the art of transferring a cinematographic film layer from adhesive attachment with one base to adhesive attachment with another base, on an endless belt having sprocket hole teeth and traveling in an orbital path which has curved portions and relatively straight portions, the method which comprises feeding the bases to the belt with the second base against the belt and with said teeth projecting through the sprocket holes of both bases, each base being fed to the belt in one of said relatively straight portions, gradually loosening the layer from the first base and joining it to the second base while the films are traveling along said orbital path and, after the bases have traveled together through said orbital path a distance sufficient to cause the layer to adhere to the second base more firmly than to the first base, peeling the first base away from the layer.

11. In the art of transferring a cinematographic film layer from adhesive attachment with one base to adhesive attachment with another base on an endless belt having sprocket hole teeth and traveling in an orbital path which has curved portions and relatively straight portions, the method which comprises feeding the bases to the belt with the layer between the two bases and with said teeth projecting through the sprocket holes of both bases, each base being fed to the belt in one of said relatively straight portions, as the first base is fed to the belt partly loosening the layer therefrom to an extent less than that at which the layer slips on the base and then further loosening the layer from the first base and joining it to the second base while the films are traveling along said orbital path and, after the bases have traveled together through said orbital path a distance sufficient to cause the layer to adhere to the second base more firmly than to the first base, peeling the layer and first base apart.

12. In the art of transferring a cinematographic film layer from adhesive attachment with one base to adhesive attachment with another base on an endless belt having sprocket hole teeth and traveling in an orbital path which has curved portions and relatively straight portions, the method which comprises feeding the bases to the belt with the second base against the belt and with said teeth projecting through the sprocket holes of both bases, each base being fed to the belt in one of said relatively straight portions, as the first base is fed to the belt partly loosening the layer therefrom to an extent less than that at which the layer slips on the base and then further loosening the layer from the first base and joining it to the second base while the films are traveling along said orbital path and, after the bases have traveled together through said orbital path a distance sufficient to cause the layer to adhere to the second base more firmly than to the first base, peeling the layer and first base apart.

13. In the art of transferring a cinematographic film layer from adhesive attachment with one base to adhesive attachment with another on an endless belt having sprocket hole teeth and traveling in an orbital path which has curved portions and relatively straight portions, the method which comprises feeding the bases to the belt with the layer between the two bases and with said teeth projecting through the sprocket holes of both bases, each base being fed to the belt in one of said relatively straight portions immediately in advance of one of said curved portions, then drawing the bases together by the fanwise action of said teeth as the bases travel around the following curved portion and, after the bases have traveled together through the following straight portion a distance sufficient to loosen the layer from one film and attach it firmly to the other base, peeling the layer and first base apart.

14. In the art of transferring a cinematographic film layer from adhesive attachment with one base to adhesive attachment with another on an endless belt having sprocket hole teeth and traveling in an orbital path which has curved portions and relatively straight portions, the method which comprises feeding the bases to the belt with the second base against the belt and with said teeth projecting through the sprocket holes of both bases, each base being fed to the belt in one of said relatively straight portions immediately in advance of one of said curved portions, then drawing the bases together by the fanwise action of said teeth as the bases travel around the following curved portion and, after the bases have traveled together through the following straight portion a distance sufficient to loosen the layer from one film and attach it firmly to the other base, peeling the first base away from the layer.

15. In the art of transferring a cinematographic film layer from adhesive attachment with one base to adhesive attachment with another on an endless belt having sprocket hole teeth and traveling in an orbital path which has curved portions and relatively straight portions, the method which comprises feeding the bases to the belt with the layer between the two bases and with said teeth projecting through the sprocket holes of both bases, each base being fed to the belt in one of said relatively straight portions immediately in advance of one of said curved portions, then drawing the bases together by the fanwise action of said teeth as the bases travel around the following curved portion, as the first base is fed to the belt partly loosening the layer therefrom to an extent less than that at which the layer slips on the base and then further and, after the bases have traveled together through the following straight portion a distance sufficient to loosen the layer from one film and attach it firmly to the other base, peeling the layer and first base apart.

16. In the art of transferring a cinematographic film layer from adhesive attachment with one base to adhesive attachment with another on an endless belt having sprocket hole teeth and traveling in an orbital path which has curved portions and relatively straight portions, the method which comprises feeding the bases to the belt with the second base against the belt and with said teeth projecting through the sprocket holes of both bases, each base being fed to the belt in one of said relatively straight portions immediately in advance of one of said curved portions, then drawing the bases together by the fanwise action of said teeth as the bases travel around the following curved portion, as the first base is fed to the belt partly loosening the layer therefrom to an extent less than that at which the layer slips on the base and then further and, after the bases have traveled together through the following straight portion a distance sufficient to loosen the layer from one film and attach it firmly to the other base, peeling the first base away from the layer.

17. The method of transferring a layer of picture carrying medium from one cinematographic base to another which comprises adhesively joining the outer face of the layer to the new base, weakening the adhesion between the layer and the original base, and peeling the layer and original base apart, characterized by effecting said joining and at least the latter part of said weakening while the two bases are traveling in superposition on a carrier having a succession of register teeth which hold the bases in registration by engagement in the sprocket holes of the films, whereby the pictures occupy positions in relation to the sprocket holes of the new base precisely the same as the positions which they formerly occupied in relation to the corresponding sprocket holes of the original base.

18. The method according to claim 17 further characterized in that said weakening is partially effected before the original base is fed to the carrier but not enough to permit the layer to slip relatively to the original base before the two films are brought together in precise registration on the carrier.

19. The method according to claim 17 further characterized in that, at a location farther along the path of the film while still on the carrier, a second layer is transferred in like manner from a third base into superposition to the first layer on said new base.

20. The method according to claim 17 further characterized in that said weakening is effected with a liquid which is applied to the face of said layer before the face contacts the new base.

GERALD F. RACKETT.

REFERENCES CITED

The following references are of record in the file of this patent:

UNITED STATES PATENTS

| Number | Name | Date |
| --- | --- | --- |
| 1,610,826 | Thornton | Dec. 14, 1926 |
| 1,707,699 | Whitney | Apr. 2, 1929 |
| 1,831,771 | Thornton | Nov. 10, 1931 |
| 2,126,137 | Potter | Aug. 9, 1938 |
| 2,167,732 | Verinderen | Aug. 11, 1939 |
| 2,182,814 | Marasco | Dec. 12, 1939 |
| 2,271,572 | Rackett | Feb. 3, 1942 |
| 1,707,710 | Comstock | Apr. 2, 1929 |
| 306,594 | Eastman | Oct. 14, 1884 |
| 1,930,291 | Thornton | Oct. 10, 1933 |